United States Patent [19]
Shaw

[11] 3,823,916
[45] July 16, 1974

[54] IMPLEMENTS
[75] Inventor: Malcolm William Shaw, Alcester, England
[73] Assignee: M. W. Shaw (Steelworkers) Limited, Alcester, Warwickshire, England
[22] Filed: Dec. 18, 1972
[21] Appl. No.: 316,120

[30] Foreign Application Priority Data
Jan. 22, 1972  Great Britain ...................... 3131/72

[52] U.S. Cl. ............................... 254/132, 214/3 R
[51] Int. Cl. ................................................ B66f 3/00
[58] Field of Search ............................. 254/29–31, 254/132, 124; 144/34 A; 37/2 R; 214/3 R

[56] References Cited
UNITED STATES PATENTS
2,535,054  12/1950  Ernst et al. ........................ 254/132
2,535,099  12/1950  Slick ................................... 254/132
2,803,431  8/1957   Cooper ............................... 254/132
3,643,920  2/1972   Widegren ....................... 144/34 A Primary Examiner—Othell M. Simpson
Attorney, Agent, or Firm—Marshall & Yeasting

[57]    ABSTRACT

The invention provides apparatus for uprooting trees or tree stumps and for mounting on a tractor, and includes a first frame having plates which can be swung into a ground contacting position to provide a reaction to force used in the uprooting action, and a sub-frame mounted on the frame and hydraulically powered to lift relative to the frame, the sub-frame carrying a pair of jaws which are hydraulically powered to grip the tree or stump between them.

6 Claims, 5 Drawing Figures

IMPLEMENTS

BACKGROUND OF THE INVENTION

This invention relates to implements for use in agriculture or for land clearing prior to building operations, for example, and its object is to provide an implement particularly adapted for tearing up trees, shrubs, and like vegetation.

SUMMARY OF THE INVENTION

In accordance with the present invention, an implement for uprooting trees comprises a frame provided with ground contacting means, a sub-frame mounted on the frame and movable in an upward direction relative to the frame by power means, and power or manually operated jaw means provided on the sub-frame.

DESCRIPTION OF THE PREFERRED EMBODIMENTS

Figure 1:
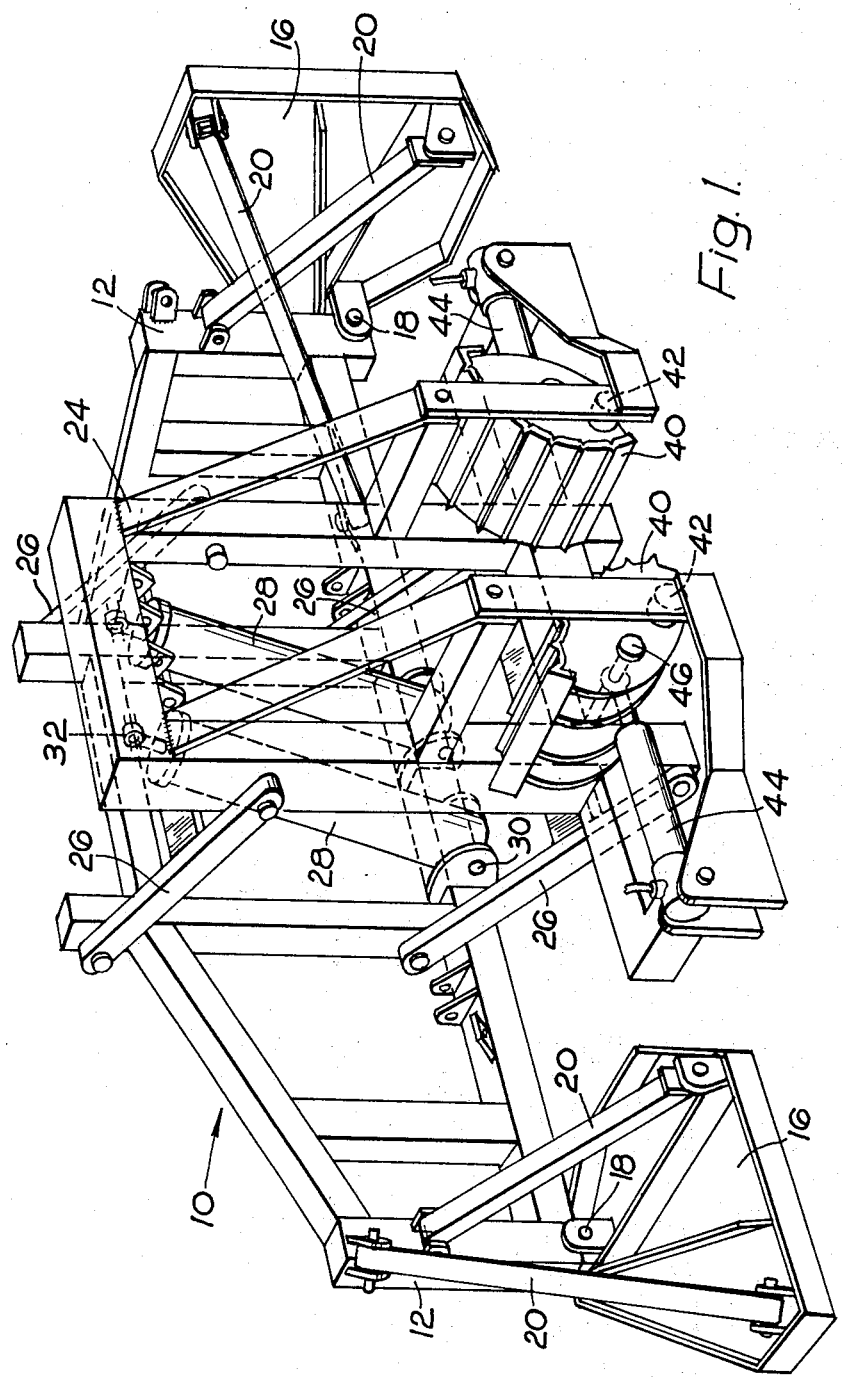
FIG. 1 is a perspective view of the preferred embodiment.
Figure 2:
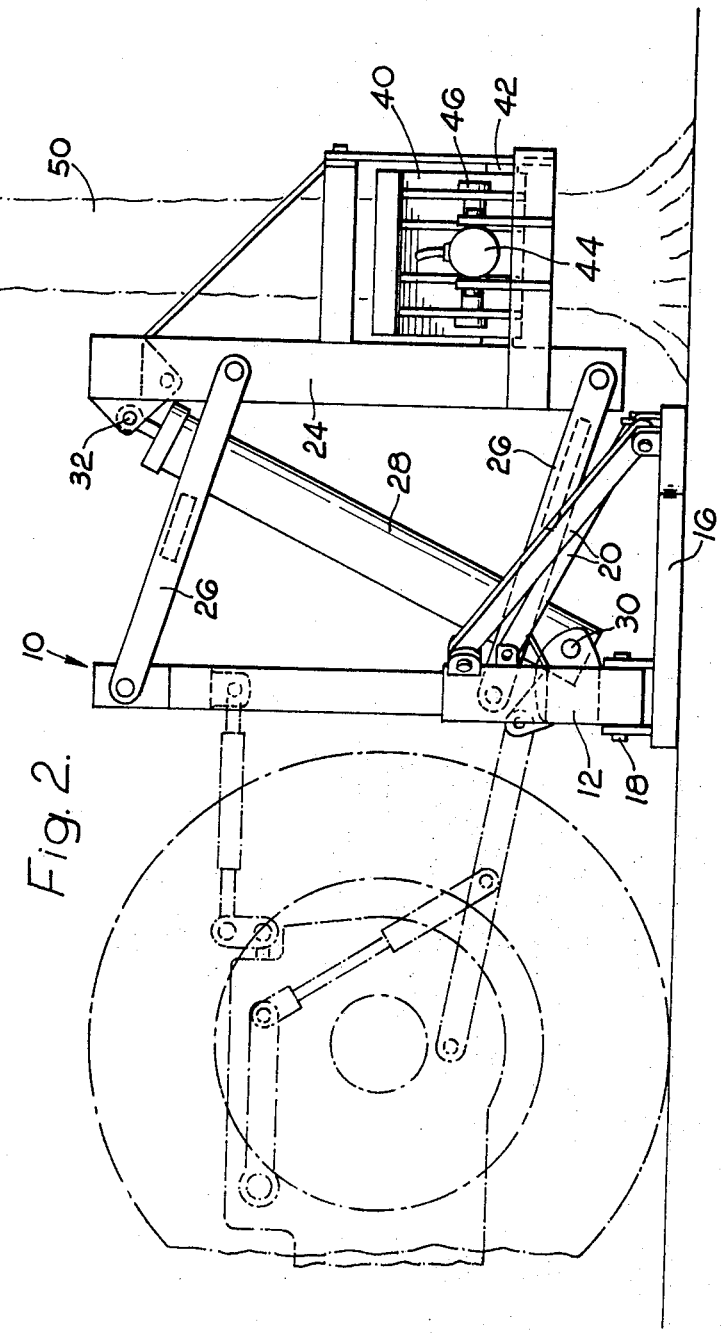
FIG. 2 is an elevation of the same.
Figure 3:
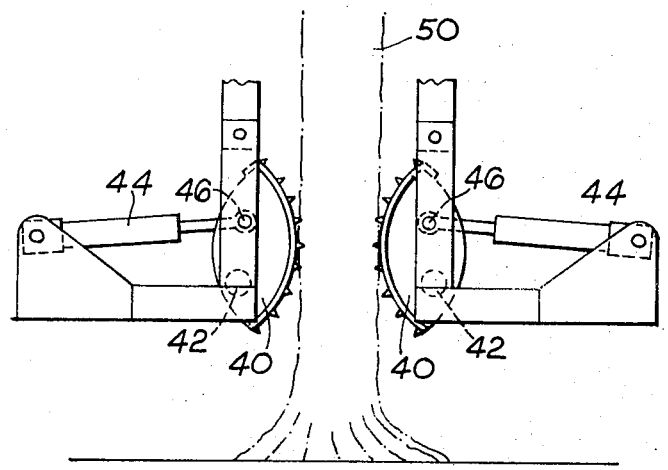
FIG. 3 is a fragmentary rear elevation on a reduced scale.

In the drawings, with reference first to FIGS. 1–3, a tree uprooting implement is adapted to be mounted at the rear of a conventional agricultural tractor shown in chain dot-lines, FIG. 2, and supported on the three point lifting linkage of the same.

The implement comprises a first and main frame 10 which includes a pair of upright posts 12, one at each end and hence at each of the lateral sides of the tractor and behind the rear wheels of the latter when the implement is mounted on the tractor in a position for use, the posts being connected by a horizontal member and possibly with diagonal bracing (not shown). Each post is associated with a foot plate 16 pivoted at 18 at the lower end of the post and with struts 20 provided to allow the plates to be located in a horizontal plane as illustrated on the left hand side of FIG. 1 for ground engagement as will be hereinafter explained, the struts being releasable to allow the plates to be folded for storage when not in use as illustrated on the right hand side of FIG. 1.

A sub-frame 24 is provided and connected to the main frame by a parallel linkage 26, the sub-frame being movable generally in a vertical plane and parallel to the main frame, a hydraulic cylinder 28 (or more than one, as illustrated) being provided extending between a low point 30 of one frame and an upper point 32 of the other frame for expansion and contraction via the tractor hydraulic system and under the control of an appropriate valve, for causing said vertical movement.

The sub-frame is provided with clamp means, which may take various forms. In one form, as shown in FIGS. 1–3, a pair of jaws 40 are provided with convex faces adjacent one another and mounted on parallel shafts 42 extending in a fore and aft direction relative to the normal movement of the tractor and the two jaws may be driven by second hydraulic cylinders 44 likewise connected into the tractor power system. The jaws may have horizontally serrated gripping faces as shown and have an eccentric or cam-like movement in displacement from a maximum spaced position to a minimum position due to the connection point 46 being offset from the pivot 42, and to the shape of the jaws.

In use, the main frame is lowered by the tractor linkage until the posts rest upon the ground, and the foot plates are then held in the horizontally extending position by the struts. The jaws are assumed to be located one on either side of the trunk of a tree (50, FIG. 3) to be uprooted and the second hydraulic cylinders 44 are closed to cause the jaws to grip the trunk. The first hydraulic cylinder(s) 28 is then expanded or contracted as the case may be and according to its location in the implement, to elevate the sub-frame relative to the main frame, and because the jaws are mounted on the sub-frame and grip the trunk, the tree is then uprooted.

In general there will be a tendency for the jaws to slip relative to the trunk depending upon the root system of the tree and the nature of the ground, and if the jaw serrations become embedded in the trunk this may cause the jaws to be drawn or urged towards a more closed position as a result of relative movement, thus increasing the grip. Any tendency for the posts to be driven into the ground is prevented by the foot plates.

Figure 4:
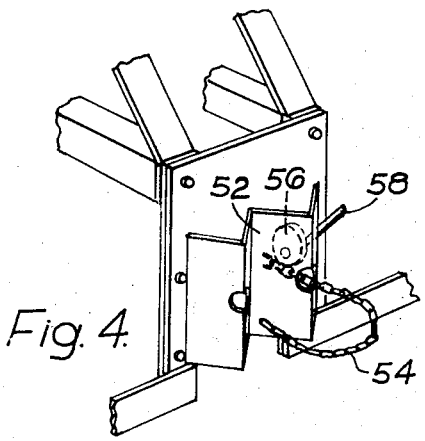
FIGS. 4 and 5 show two modifications.

In an alternative arrangement of gripping means (FIG. 4), a jaw has a V-shaped gripping surface 52 (or more than one such) and a chain 54 extends from the one side of the jaw around the tree trunk and to the other side of the jaw, the chain being tightened by a sprocket or cam device 56 which is rotated or angularly displaced by a hand operated lever 58 so as to clamp the trunk between the chain and the jaw.

In another modification (FIG. 5) scissor-like jaws 60 may be movable together by the second cylinders in a vertical plane to grasp or sever tree roots and the like which extend generally horizontally.

Figure 5:
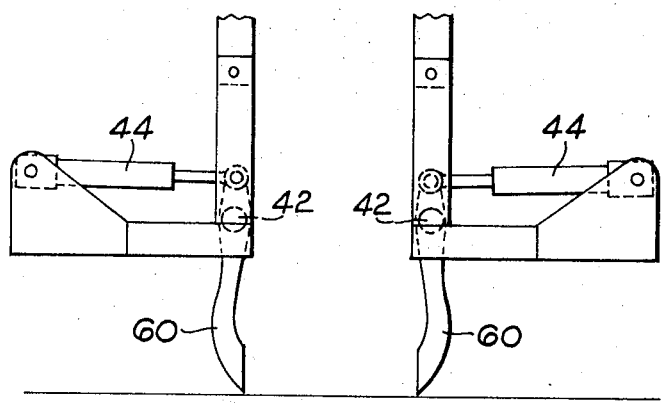

If desired, the sub-frame may be arranged to accept any of a range of the jaws or blades with minor repositioning of the hydraulic cylinder, as will be seen for example by reference to and comparison of FIGS. 3 and 5.

As and when uprooting is completed, the complete frame may be elevated by the tractor linkage so that the tractor can carry away the tree or other vegetation.

I claim:

1. An implement for uprooting trees, comprising:
   a main frame having connection points for attachment to a three-point linkage of a tractor and adapted to be supported from the tractor in a vertical disposition;
   ground-engaging members provided on the main frame;
   a sub-frame mounted on the main frame in horizontally spaced parallel relation thereto by pairs of links which permit vertical movement of the sub-frame relative to the main frame;
   at least one vertically-inclined hydraulic ram acting between a lower portion of one frame and an upper portion of the other frame and actuable to create relative vertical movement therebetween; and
   jaw means carried by the sub-frame and operable to secure a tree trunk to the sub-frame for movement therewith upon actuation of said hydraulic ram.

2. An implement according to claim 1 wherein the jaw means comprises two jaw members mounted on the sub-frame for pivotal movement about respective laterally-spaced horizontal axes such that the jaw members are movable towards and away from one another in a vertical plane parallel to the main frame, and wherein each jaw member has an hydraulic actuator associated therewith to effect such movement thereof.

3. An implement according to claim 1 wherein the jaw means comprises a pair of jaw members; each jaw member presents a convex gripping face; the jaw members are mounted for pivotal movement about laterally-spaced horizontal axes with the gripping faces thereof presented towards one another, said axes being disposed eccentrically with respect to the centres of curvatures of the respective gripping faces; and further hydraulic rams are provided on the sub-frame and are cooperable with the respective jaws to pivot the same towards and away from one another in a vertical plane.

4. An implement according to claim 3 wherein said gripping faces of the jaw members are formed with serrations.

5. An implement according to claim 3 wherein said further hydraulic rams are arranged with their axes extending transversely of the fore-and-aft axis of the tractor.

6. An implement according to claim 1 wherein the jaw means comprises a gripping member which is V-shaped in horizontal section, a chain connected to the gripping member and adapted to be looped around a tree, and means for contracting the loop to draw the gripping member firmly into engagement with the tree.

* * * * *